United States Patent [19]

Yamashita et al.

[11] Patent Number: 5,555,362
[45] Date of Patent: Sep. 10, 1996

[54] METHOD AND APPARATUS FOR A LAYOUT OF A DOCUMENT IMAGE

[75] Inventors: Akio Yamashita, Urawa; Kazuharu Toyokawa, Yamato, both of Japan

[73] Assignee: International Business Machines Corporation, Armonk, N.Y.

[21] Appl. No.: 507,061

[22] Filed: Jul. 26, 1995

Related U.S. Application Data

[63] Continuation of Ser. No. 956,702, Oct. 5, 1992, abandoned.

[30] Foreign Application Priority Data

Dec. 18, 1991 [JP] Japan ..................................... 3-333778

[51] Int. Cl.⁶ ..................................................... G06F 17/00
[52] U.S. Cl. ........................... 395/145; 382/173; 382/176
[58] Field of Search ..................................... 395/145, 148; 382/9.1, 173, 175, 176, 180, 199, 192, 309

[56] References Cited

U.S. PATENT DOCUMENTS

| | | | |
|---|---|---|---|
| 5,073,953 | 12/1991 | Westdijk | 382/9 |
| 5,185,813 | 2/1993 | Tsujimoto | 382/180 |
| 5,379,373 | 1/1995 | Hayashi et al. | 395/148 |

OTHER PUBLICATIONS

Tsujimoto et al., "Understanding Multi–articled Documents", Proceedings of the 10th International Conference on Pattern Recognition, (IEEE 1990), pp. 551–556.

Casey, "Intelligent Forms Processing", IBM Systems Journal, vol. 29 No. 3 (1990), pp. 435–450.

Fletcher, "A Robust Algorithm for Text String Separation from Mixed Text/Graphics Images", IEEE Transaction on Pattern Analysis and Machine Intelligence, vol. 10 No. 6 (Nov. 1988), pp. 910–918.

*Primary Examiner*—Heather R. Herndon
*Assistant Examiner*—Joseph H. Feild
*Attorney, Agent, or Firm*—A. Bruce Clay; Edward H. Duffield

[57] ABSTRACT

The present invention provide a method for extracting a tree structure by using image analysis results of an actual document and generating a flexible layout model. A tree structure and layout model are newly generated by automatically extracting the tree structure in accordance with document image analysis before a user executes graphical correction. That is, an inputted document image is physically analyzed to extract a separator with a high possibility to separate the objects of the document and segment the above document image into a plurality of areas in accordance with the information for the separator. Then, the area segmentation is displayed on a display unit together with a document image and interactively corrected by the user to define a desired tree structure and complete a flexible layout model by setting a parameter to each node of the tree structure.

2 Claims, 11 Drawing Sheets

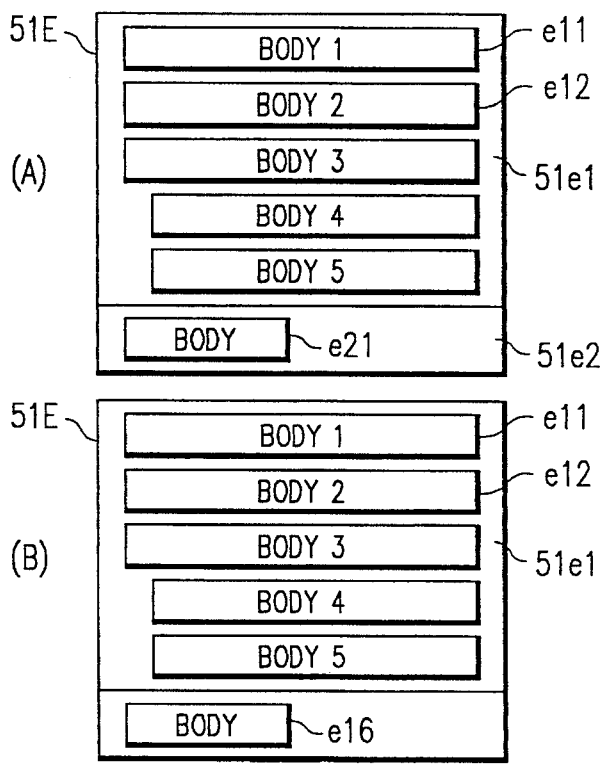
FIG. 9
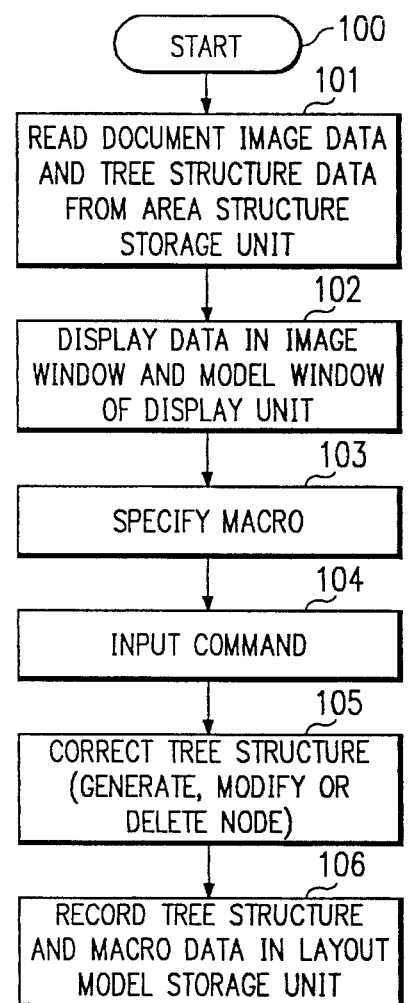
FIG. 10
FIG. 11

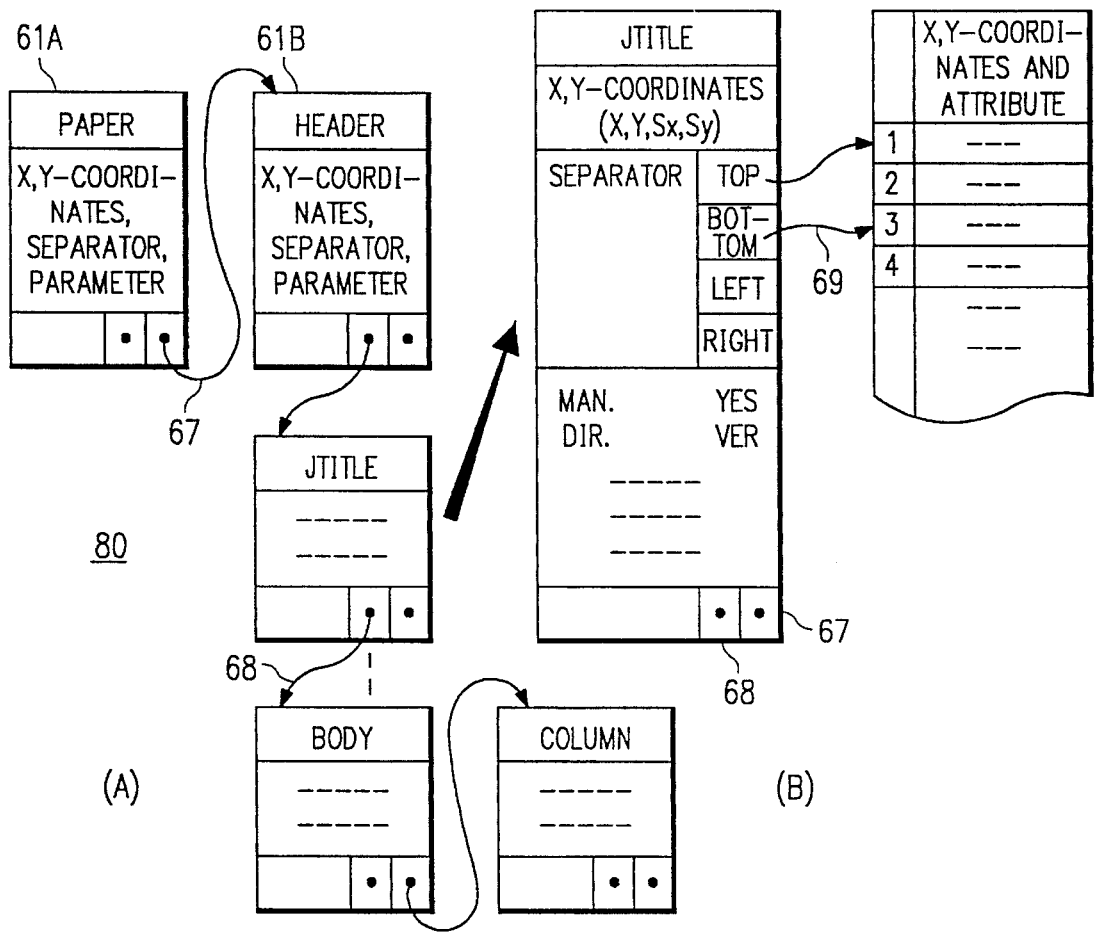

| NEST | NAME | MAN. | DIR. | ELEMENT | MIN. | MAX. | SEPAR. | RECO. |
|---|---|---|---|---|---|---|---|---|
| 0 | PAPER | YES | VER | DUMMY | 1 | 1 | LRTB | N/A |
| 1 | HEADER | YES | VER | STRING | 1 | 1 | LRTB | YES |
| 1 | JTITLE | YES | VER | STRING | 1 | 3 | LRT | YES |
| 1 | JAUTHOR | YES | VER | STRING | 1 | 3 | LR | YES |
| 1 | ETITLE | YES | VER | STRING | 1 | 3 | LR | YES |
| 1 | EAUTHOR | YES | VER | STRING | 1 | 3 | LR B | YES |
| 1 | ABSTRACT | YES | VER | STRING | 1 | 10 | LRTB | YES |
| 1 | BODY | YES | HOR | DUMMY | 1 | 3 | LRTB | N/A |
| 2 | COLUMN | YES | VER | DUMMY | 1 | 1 | LRTB | N/A |
| 3 | M-BLOCK | YES | VER | DUMMY | 1 | 10 | LRTB | N/A |
| 4 | BLOCK | YES | VER | STRING | 1 | N | LRTB | YES |
| 3 | FOOTNOTE | NO | VER | STRING | 1 | 6 | LRTB | YES |
| 1 | PAGE | YES | VER | DUMMY | 1 | 1 | LRTB | YES |

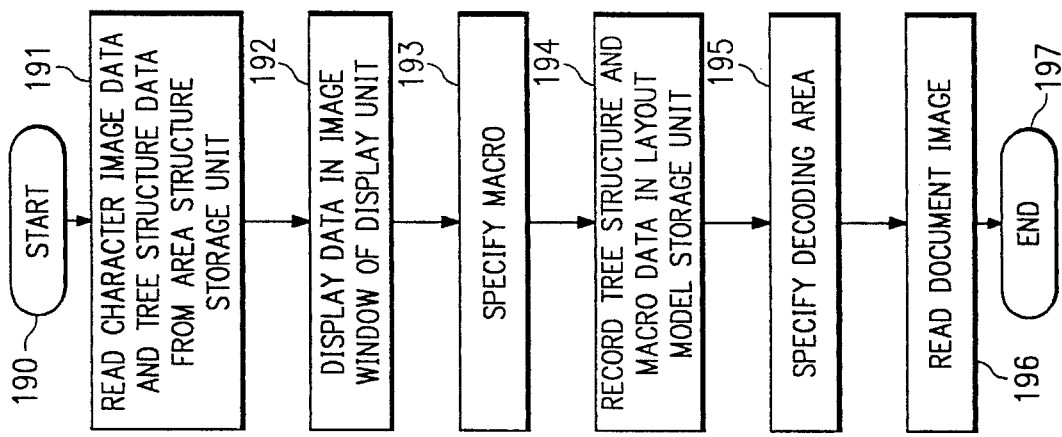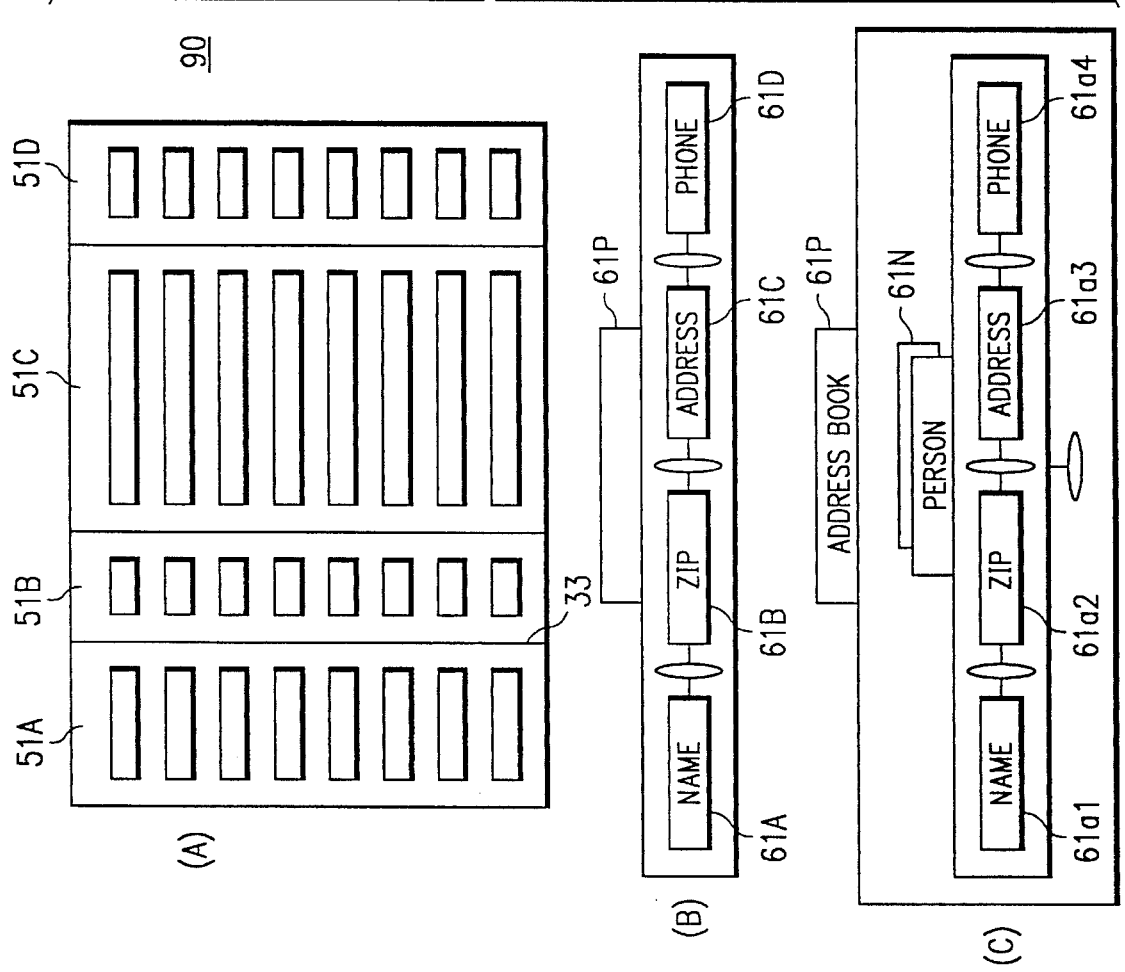

METHOD AND APPARATUS FOR A LAYOUT OF A DOCUMENT IMAGE

The application is a continuation, of application Ser. No. 07/956,702, filed Jan. 5, 1992 now abandoned.

BACKGROUND OF THE INVENTION

Development is under way of an OCR which processes the image of a printed document and codes the document contents through character recognition to read them. For this type of OCR, it is a known method to analyze the image of a document to segment it into objects such as character strings, graphics, and tables, and structure the data for the objects as a tree structure hierarchically expressing the layout relationship between the objects. For example, the official gazette of PUPA No. 2-59880 discloses a method for structuring the objects constituting a document and the layout relationship between the objects as a tree structure in accordance with the inputted document image and read characters in a desired area from the present document image by specifying an object area whose layout is displayed in accordance with the tree structure.

The official gazette of PUPA No. 3-17771 discloses a method for generating a document in which character information and image information are laid out as a tree structure of layout objects in order of a block, frame, page, and page set from the bottom by a document processor. This method makes it possible to edit a document covering different objects by specifying an area to edit the document, generating a frame equivalent to the specified area, detecting layout objects in the specified area, generating a new layout object equivalent to an area combined with the specified area, and connecting the new object to the lower rank of the generated frame. These methods lay out each object of a document image by using a hierarchical tree structure. However, the type of document is restricted to which prepared tree structure or layout form can be directly applied. To form a new tree structure or layout model each time, it is necessary to define a complex hierarchical structure and, moreover, it is difficult to intuitively understand the hierarchical structure. Therefore, this is not easy for general users.

SUMMARY OF THE INVENTION

It is an object of the present invention to provide a method for simply extracting and generating a tree structure to hierarchically express the relationship between objects of any type of document from a document image.

It is another object of the present invention to provide a method for generating a flexible layout model by using image analysis results of an actual document.

It is still another object of the present invention to provide an interface for visually displaying the hierarchical structure of a complex model to decrease the load of a user in generating a document image layout model.

For the present invention, a tree structure is automatically extracted through image analysis before a user forms a new tree structure or layout model by interactively executing graphical correction.

That is, a document image is physically analyzed to automatically extract a separator with a high possibility to separate the objects of the document and the document image is segmented into tree structure areas in accordance with the information for the separator. Then, the area segmentation of the tree structure is displayed on a display unit and a user interactively executes necessary correction to define a desired tree structure. A parameter is then set for each node of the tree structure to complete a flexible layout model.

To describe the layout of a document image, a tree structure model consisting of rectangular hierarchies horizontally and vertically arranged is generally used. The layout model related to the present invention basically comprises a rectangular hierarchical structure.

Following is the description of the method for generating the layout model of a document image in accordance with the image analysis of the present invention.

BRIEF DESCRIPTION OF THE DRAWINGS

For a more complete understanding of the present invention and the advantages thereof, reference is now made to the Detailed Description taken in conjunction with the attached Drawings, in which:

FIG. 9 shows the processing by the command "MOVE RECTANGLE" for segmented area correction;

FIG. 10 shows a flow for macroparameter specification and layout model generation;

FIG. 11 shows the state for setting a macroparameter;

FIG. 12 shows the data format of the layout model in a storage unit;

FIG. 13 shows an example of definition for a layout model which is expressed in the text format when it is stored in an external memory such as ASCII file;

FIG. 18 shows another embodiment for automatically correcting area segmentation;

FIG. 19 shows a flow for setting parameters to an image window as another embodiment of the present invention.

DETAILED DESCRIPTION OF THE INVENTION

Figure 1:
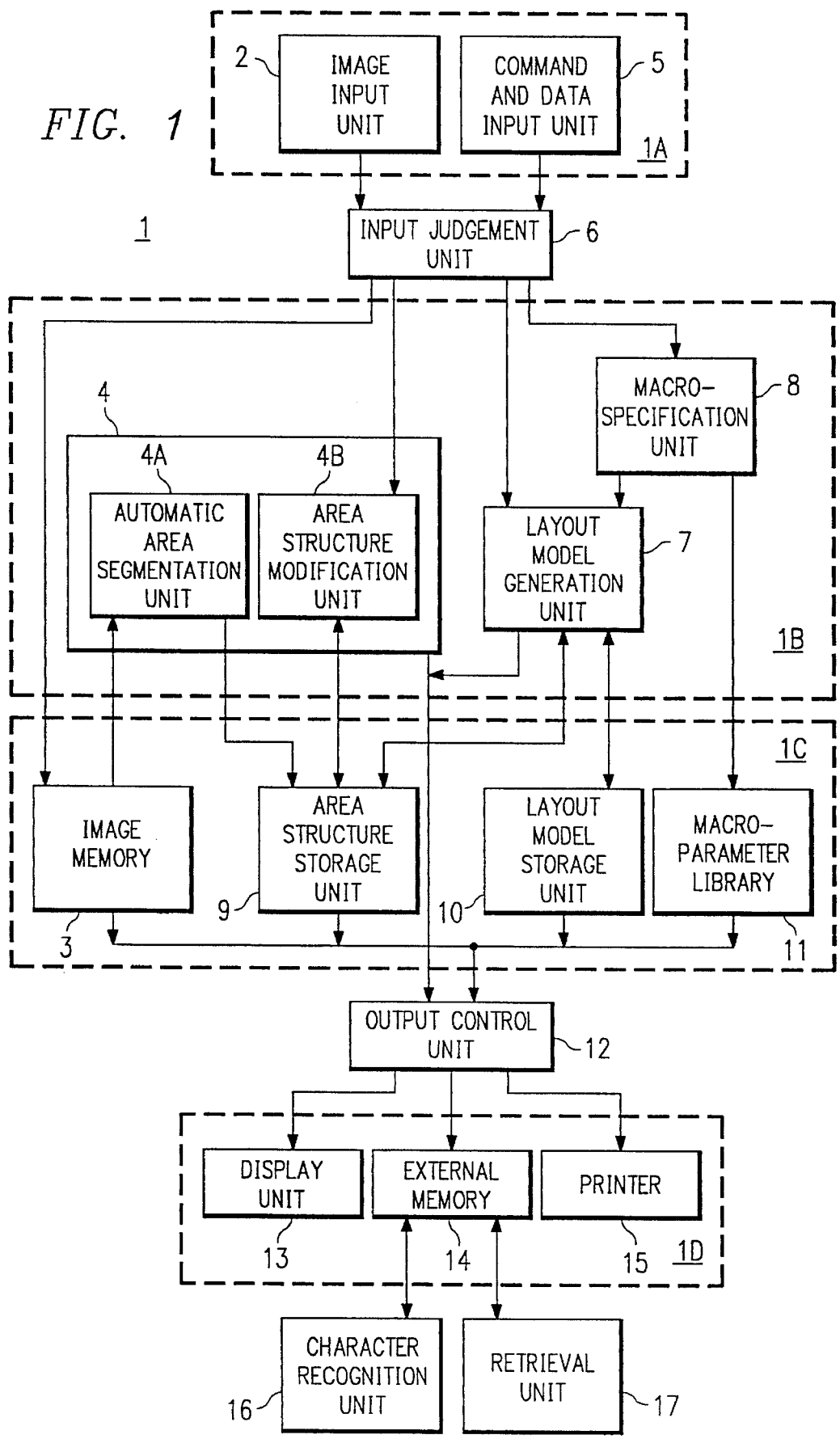
FIG. 1 shows the entire structure of the electronic filing system which is an embodiment of the present invention.

FIG. 1 shows the general structure of the electronic filing system which is an embodiment of the present invention. In FIG. 1, reference numeral 1 generally indicates a layout model generation apparatus which comprises an input unit 1A, processing unit 1B, recording unit 1C, and output unit 1D. A document whose layout model is to be generated is scanned by an image input unit 2 like an image scanner and its image information is recorded in an image memory 3. The image information is sent to an automatic area segmentation unit 4A of an area generation unit 4 where the image area is automatically segmented. The results of area segmentation are recorded in an area structure storage unit 9. The commands and data by which the user executes various processings are selected and inputted by command and data input units 5 using such as a mouse and sent to a corresponding section of the processing unit 1B through an input judgment unit 6. For example, when it is necessary to correct a segmented area as the result of area segmentation, a correction command is sent to an area structure modification unit 4B in accordance with the operation of the user. Numeral 7 indicates a layout model generation unit for generating a layout model by applying necessary modification to the results of area segmentation of the document image and setting a parameter. Numeral 10 indicates a layout model storage unit for recording the data for the layout model. Numeral 8 indicates a macro specification unit for setting parameters by using the data held in a macroparameter library 11. The situations of document image area segmentation and layout model generation are successively displayed on a screen display unit 13 through an output control unit 12 and used for the interactive operation of the user. Each processing-result is outputted to external memory 14 or printer 15. Numeral 16 indicates a character recognition unit for reading characters from the image information of a document image, and numeral 17 indicates a retrieval unit for retrieving the document image by using a layout model.

Figure 2:
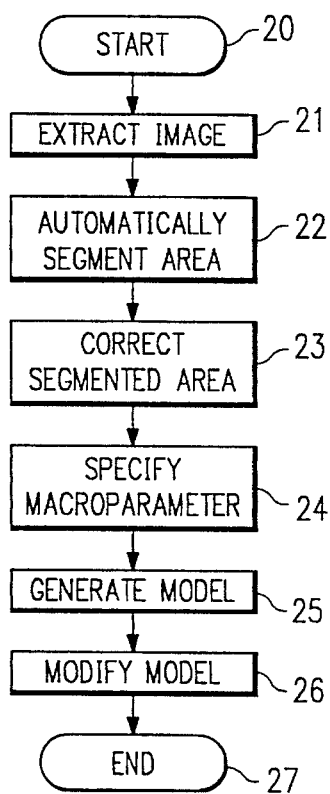
FIG. 2 shows a processing flow of the layout model generation apparatus in FIG. 1.

FIG. 2 shows a processing flow of the layout model generation unit 1 in FIG. 1. First, a document image is scanned by the image input unit 2, and character strings, vertical and horizontal black lines, and other black pixel regions (picture-element) are extracted from the image and stored in the image memory 3 (Step 21). Subsequent processing is executed in accordance with extracted rectangle data. Then, area segmentation of the document image is automatically executed by the automatic area segmentation unit 4A of the area generation unit 4 (Step.22). First, long, wide, and White pixel regions and long black lines to serve as separators for objects are extracted from the x,y-coordinates of the rectangle. Then, graphic areas are removed before character areas are roughly segmented using the extracted separator. Moreover, subseparators to serve as a boundary between objects are obtained from the change of line pitch and character size in the character areas and the areas are sub-divided in accordance with the subseparators.

The area structure data thus obtained by analyzing the image, that is, the x,y-coordinates of rectangles and areas, the relationship between the areas, and tree structure data corresponding to the x,y-coordinates are stored in the area structure storage unit 9. Then, the results are displayed on the screen display unit 13.

The user graphically corrects the segmented areas of the area structure data through the area structure modification unit 4B to form a desired tree structure by viewing the display on the screen display unit 13 to judge the necessity for correction and inputting a correction command when necessary (Step 23 ).

Moreover, a parameter is set to each node of the tree structure by the macro specification unit 8 (Step 24).

Because the minimum and maximum number of lines can approximately be specified for the objects of a document image, parameters are not separately set but are set by using the macroparameter previously held in the macroparameter library 11. As a result, a layout model is generated by the model generation unit 7 (Step 25) and the data for the layout model is recorded in the layout model storage unit 10. The layout model is also displayed on the screen display unit 13, which is modified by the layout model generation unit 7 when the user inputs a correction command (Step 26).

Each step of the processing flow shown in FIG. 2 is described below in detail.

Figure 3:
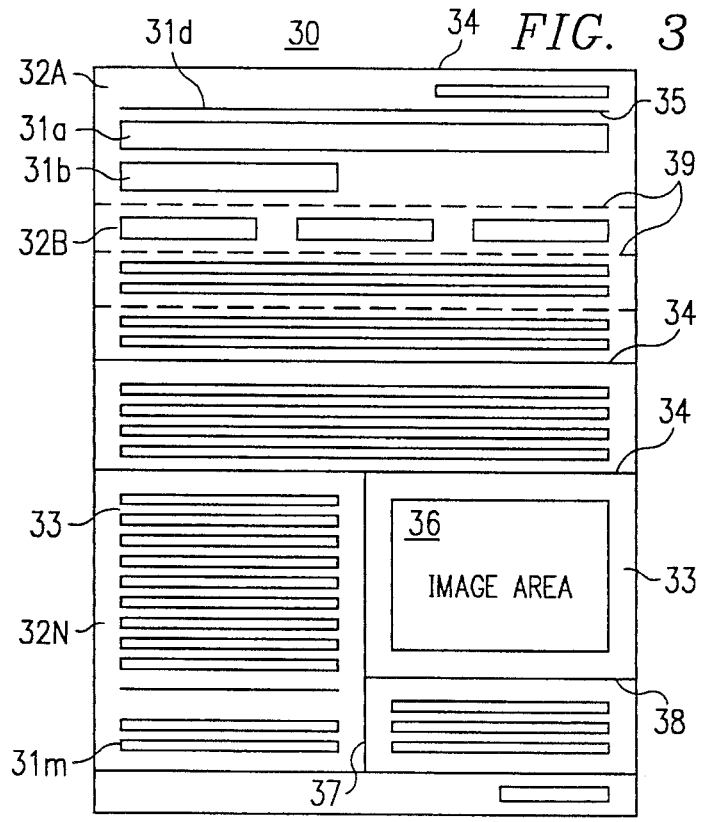
FIG. 3 shows the area segmentation of a document image.

For the first image extraction (Step 21 in FIG. 2), the document image is scanned by the image input unit 2, and then character strings and other black rectangles are extracted and a document image data 30 consisting of many rectangular areas shown in FIG. 3 is extracted to be stored in the image memory 3. According to the known black components labeling method and run-length combining method, it is possible to express all character strings, black lines, and other black pixel regions from a document image by expressing them in rectangles. Then, rectangle collection enclosing white pixel regions 32A through 32N is obtained in accordance with the rectangles of character strings ($31a$ through $31n$) and vertical and horizontal black lines such as $31d$. For this embodiment, description is hereafter made by premising that all character strings (or sub-character strings) are extracted as rectangular areas. Detailed description of the character-string extracting method is shown in the following literature which is incorporated herein by reference.

(1) "A Character String Extraction Algorithm Using Horizontal Boundaries", Proc. SPIE/SPSE, vol. 1452-23, pp. 330–339, 1991, written by T. Amano, A. Yamashita, and H. Takahashi (2) Official gazette of PUPA No. 1-253077

Figure 4:
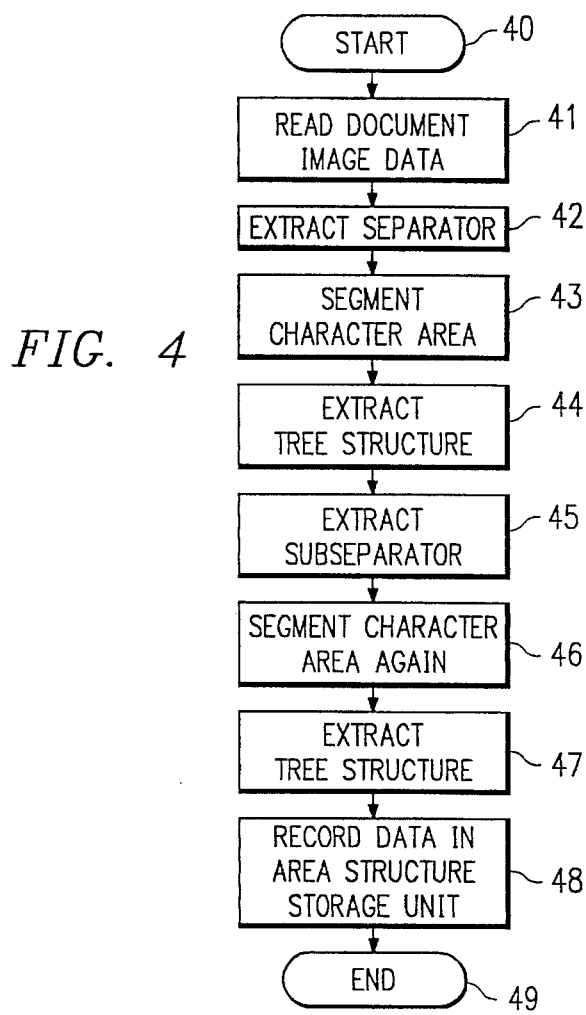
FIG. 4 shows the flow for area segmentation by the automatic area segmentation unit in FIG. 1.

The processing for area segmentation of a document image (Step 22) is executed by the automatic area segmentation unit 4A in accordance with the procedure illustrated in FIG. 4.

First, the document image data 30 is fetched from the memory 3 (Step 41). Then, white pixel rectangles close to each other with approximately the same height are unified before all rectangles with a length and width larger than a certain value are extracted as vertical and horizontal separators (reference numerals 33 and 34 in FIG. 3) to record the X,Y coordinate values of them on the document image in the area structure storage unit 9. However, horizontal separators whose both ends do not contact a vertical separator are not recorded. A black line $31d$ with a certain length or more is recorded as a black line separator 35 (Step 42). It is preferable to dynamically determine the threshold values of width and length by examining the distribution of the white pixel rectangle size for each document image. Among the separators extracted here, only those with a high reliability (wide and long separators) are recorded as sub-separators in order to prevent errors of area segmentation to be successively executed.

The character area is then segmented in accordance with vertical and horizontal separators (reference numerals 33 and 34) (Step 43). Before segmentation, an image area 36 is excluded from the processing objects by specifying it with the distribution of the above separators, extracted character strings, and rectangles other than character strings. The image area can be separated from the character area by using a characteristic value such as the neighborhood line density as reported in the existing method.

Then, a tree structure is extracted from the hierarchical relationship between the obtained rectangles, areas, and Separators (Step 44). The area segmentation direction always appears vertically and horizontally by turns as the tree structure hierarchy becomes deep. Each node of the tree structure shows a rectangle enclosing objects. The child node of a node shows a rectangle obtained by cutting the rectangle of the node horizontally or vertically.

If a vertical separator 37 for segmenting the whole of an image excluding the image area into several areas is found, the image is further segmented by using the separator 37. Then, if a horizontal separator 38 capable of segmenting each area into several areas is again found, it is further segmented into smaller areas by using the separator. Thus, the whole of the image is segmented into area groups constituting a tree structure by repeating recursive segmentation while alternately using the vertical and horizontal separators.

Then, lines, the character height for each line, and base lines are obtained from the character string group Separated into each area to estimate a line where the line pitch or character size changes in accordance with them. The interlinear space on these lines is extracted as a horizontal subseparator 39 to record the X,Y-coordinate values of the subseparator 39 (Step 45). If a white pixel rectangle with a size larger than a certain value (but smaller than a separator) for separating two character-string groups regularly arranged in the vertical direction is found, it is recorded as a vertical separator. The subseparator has a function to compensate the boundary between objects which cannot serve as separators.

Area segmentation is further repeated by using the subseparator for separating an area vertically or horizontally (Step 46).

Figure 5:
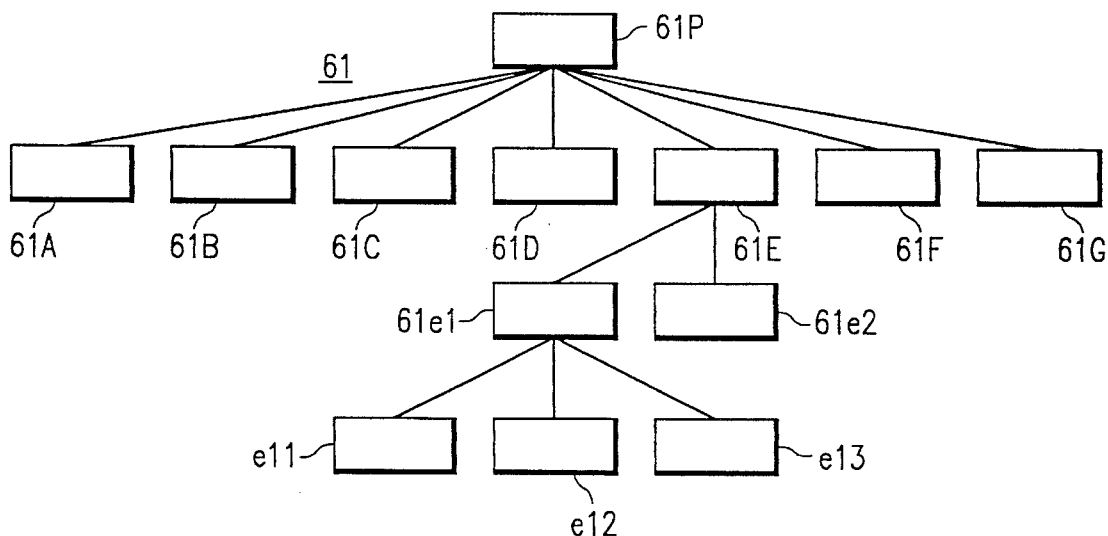
FIG. 5 shows an example of the layout model of the tree structure obtained through area segmentation.

Then, from the results of the above area segmentation, a tree structure 61 as shown in FIG. 5 is extracted by segmenting the entire image (Step 47). As the result of area segmentation, most rectangles appearing at the terminal node of the bottom layer are character strings corresponding to so-called lines. Obtained data is recorded in the area structure storage unit 9 (Step 48).

Figure 6:
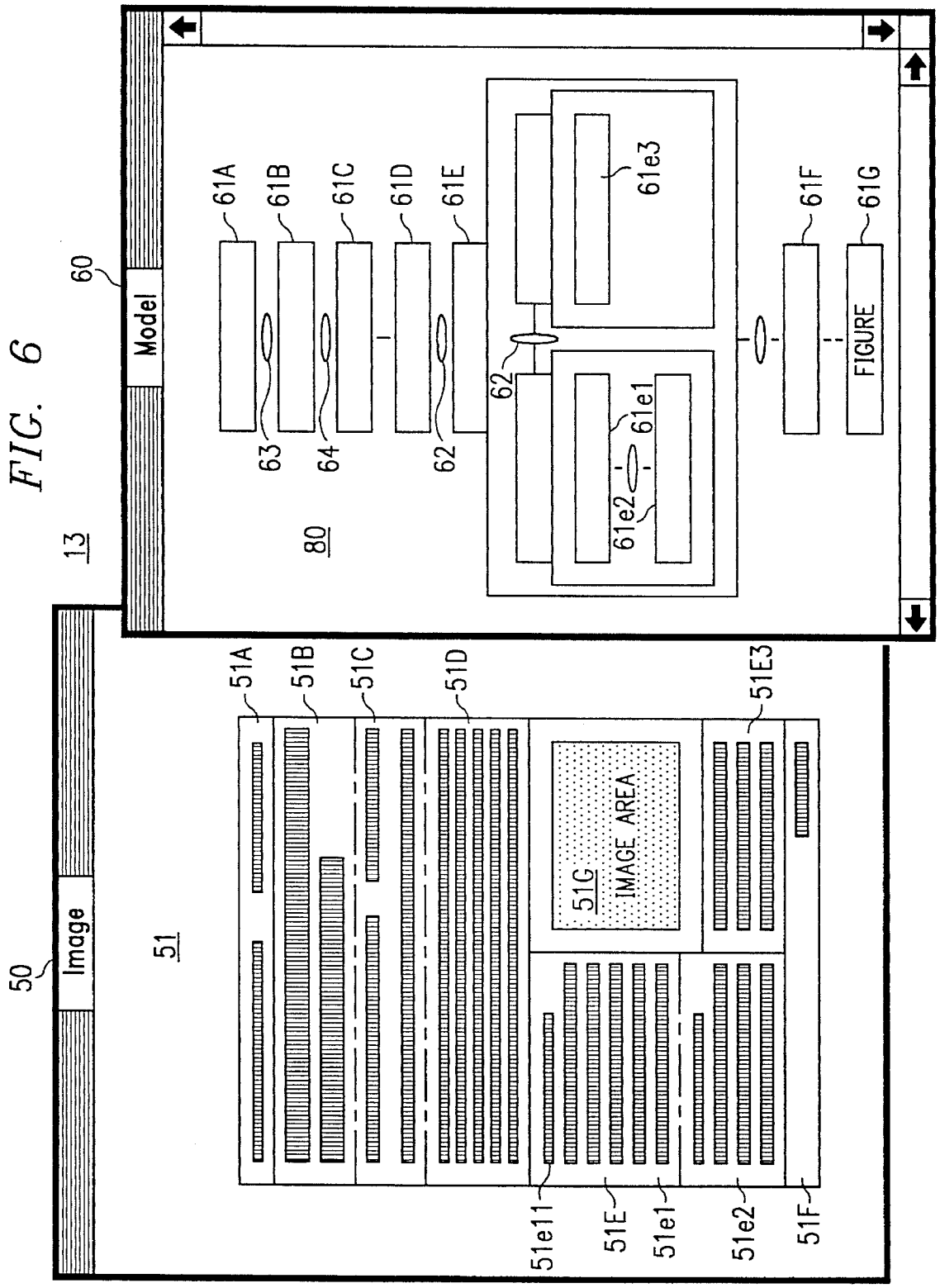
FIG. 6 shows an example of area segmentation displayed on a screen display unit.

The results of image segmentation are displayed in an image window 50 of the display unit 13 as a document image 51 as shown in FIG. 6. A layout model 80 schematically representing the tree structure 61 is displayed in a model window 60. Each of areas (51A through 51G) of the document image 51 corresponds to each of nodes (61A through 61G) of the tree structure 61. For the layout model 80 at this point, no attribute data is assigned to each node. The symbol shown at the top and bottom of each node of the tree structure 61 shows a separator or subseparator. The separator is segmented into separator 62, black line separator 63, or subseparator 64 in accordance with the type of the line. The terminal node of the tree in the character area becomes a so-called character line. The tree of the model in FIG. 6, however, shows only up to the parent node of the terminal node. A tree including up to the terminal node is internally generated. Subsequently, the object corresponding to the so-called terminal node is called a rectangle and the parent node including the rectangle or higher-rank parent node including the parent node and rectangle is called an area.

Following is a description of the area segmentation correction by the area structure modification unit 4B (see FIG. 2).

Figure 8:
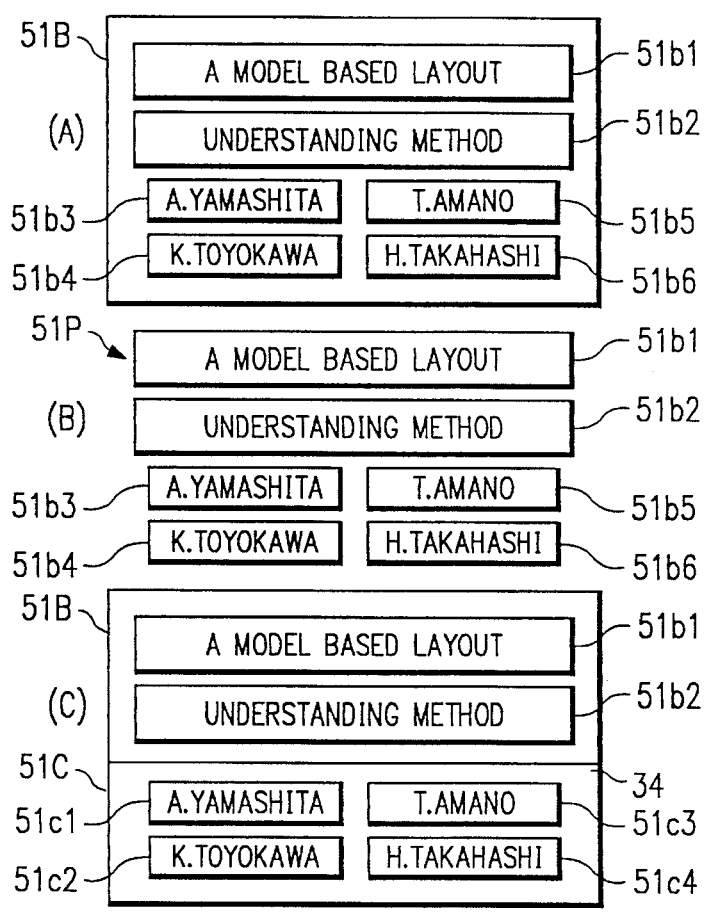
FIG. 8 shows "grouping" and "ungrouping" for segmented area corrections.

Because the previously-mentioned area segmentation (Step 22) is automatically processed in accordance with the predetermined rule, the objects of an individual document are not always correctly segmented. For (A) in FIG. 8, for example, "title" areas 51b1 and 51b2 are not separated from "author's name" areas 51b3 through 51b6 in the image area 51B. For (A) in FIG. 9, the area of "body" portion 51E of the image 51 is erroneously segmented.

Figure 7:
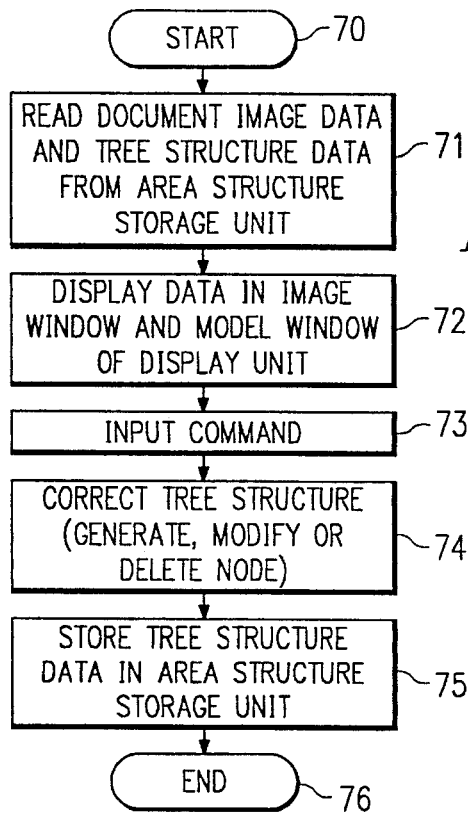
FIG. 7 shows a flow for segmented area corrections.

In this case, graphical correction of the area is changed to correct segmentation in accordances with interactive user operation. FIG. 7 shows the procedure. First, the area-segmented document image 51 and data for its tree structure 61 recorded in the area structure storage unit 9 are read (Step 71) and displayed in the image window 50 and model window 60 respectively (Step 72). Separators and subseparators are also displayed in the document image 51. The user compares the contents of the document image with the results of area segmentation to judge the validity of area segmentation. If an error is found in area segmentation, the user selects a command to execute correction by specifying an area on the image window 50 through mouse operation. The area structure modification unit 4B interprets the command inputted by the user to correct the tree structure (Steps 73 and 74). The corrected data is recorded in the area structure storage unit 9 (Step 75).

Following are the command for correcting the area structure. The correction range (rectangle or area) and position are specified with a mouse.

"GENERATE RECTANGLE": Changes the rectangular area in the specified document image 51 to a new rectangle and records the data (tree structure and x,y-coordinate values).

DELETE RECTANGLE: Deletes the data for the specified rectangular area.

MODIFY RECTANGLE: Modifies X,Y-coordinates of the specified rectangular area.

GROUPING: Unifies existing rectangles or areas by enclosing them and generates a new area.

UNGROUPING: Specifies and separates the unified areas or rectangles.

MOVE RECTANGLE: Moves a rectangle in an area to another area or outside of the area. The rectangle moved to outside of the area independently serves as a new area.

Area segmentation is corrected by combining the above command operations. For the example in FIG. 8, the areas 51b1 and 51b2 of the second descendant node and the area 51B of the child node including 51b3 through 51b6 are "ungrouped" to delete the rectangle data for the child node 51B. Then, the areas 51b1, 51b2 and 51b3 through 51b6 of a child node are formed {(B) in FIG. 8} by adding theareas 51b1, 51b2, and 51b3 through 51b6 to parent node 51P to "re-group" them into the "title" area 51B (the second descendant nodes 51b1 and 51b2) and the "author's name" area 51C (second descendant nodes 51c1 through 51c4) {(C) in FIG. 8}.

For the example in FIG. 9, the-area segmentation of the "body" portion 51E is-corrected by the command "MOVE RECTANGLE". That is, the data for "e21" is deleted from the bottom of the second descendant node 51e2 by specifying the rectangle of the third descendant node "e21" in (A) with a mouse to move it to the second descendant node 51e1. Then, the second descendant node 51e2 having no third descendant node is deleted to generate a new tree structure shown in (B) by inserting the rectangle data for the original third descendant node "e21" into the bottom of the second descendant node 51e1 as the new third descendant node "e16".

The object for processing in the correction of area segmentation is not an image but the collection of rectangles 51A through 51G obtained by extracting character strings. Therefore, not "cut and paste" like image processing, but processing similar to a graphic editor is possible.

These corrections are effective for a caption different from a body and vice versa. Similarly, it is possible to correct an error by the command "MOVE RECTANGLE".

Following is a description of specifications of the macroparameter and generation of a layout model (Steps 24 and 25 in FIG. 2) by referring to FIG. 10.

First, the data for document image and that for tree structure are read from the area structure storage unit 9 and displayed in the image window 50 and model window 60 respectively (Steps 101 and 102).

As previously described, because the nodes (61A through 61G) of the tree structure 61 are kept blank, it is necessary to set various parameters including an area name to these nodes in order to complete the tree structure as a layout model. From the results of analyzing an actual image, it is possible to know whether the top, bottom, right, and left separators are present and the number of rectangles. However, to generate a model from the image, it is necessary to consider features varying for each image (e.g. number of rectangles) and relatively stable features (e.g. presence or absence of black line). Therefore, the macroparameter set is previously defined as a default parameter set to record it in the library 11. The user checks the set with the actual analysis results and adds necessary modification before setting a parameter to each node (Step 103).

FIG. 11 shows the situation in which macroparameters are set. In FIG. 11, numeral 65 is a macroparameter set window in which the default value of each parameter displayed in macroparameter table 66 in the form of a table by corresponding to tree structure 61 is set for typical objects of the document. The macroparameter window 65 is displayed on the screen display unit so that parameters can be set through mouse operation.

As examples of the macroparameter, "Man." indicates whether an object is exactly present in the page, "Min." indicates the minimum number of child nodes, "Max." indicates the maximum number of child;nodes, and "Separ." indicates whether the top, bottom, right, and left separators are present. These parameters are previously prepared in accordance with the type of area which may appear.

Items showing a hierarchical structure (e.g. Nest., Name, and Dir.) among the above items judge the parent-child relation with the analyzed tree structure and set a new value. The items related to the separator (e.g. Separ.) reset the value suitable for analysis results when a default value does not coincide with the actual analysis result. The same is true for the number of rectangles included in an area. Thus, a layout model is defined by setting a macroparameter to an imitative tree node. It is also possible to directly set each parameter without using the macroparameter. Resultingly, layout model 80 (see FIG. 12) in which the macroparameter is set to all nodes of a tree structure extracted from a document image and recorded in the layout model storage unit 10. FIG. 12 shows the data format of the layout model 80 in the layout model storage unit 10. As shown in (A) of FIG. 12, the above macroparameter and the predetermined data are recorded in each node 61 and the connection between nodes is shown by child pointer 67 and brother pointer 68. As shown in (B) of FIG. 12 in detail, x,y-coordinate values are recorded in each node and details of the separator are recorded by pointer 69.

The table in FIG. 13 shows a definition of a layout model which is expressed in the text format to be stored in the external memory 14 as an ASCII file. In the table of FIG. 13, the parameter "Nest" shows the depth of the tree structure level, "Dir." shows the direction in which child nodes are arranged, "Element" shows whether a child node is a rectangle (String) or an area (Dummy), and "Reco" shows whether it should be recognized by the character recognition unit (Yes) or not (No, N/A).

More detailed description of the layout model and its definition and area segmentation method is given in the below literature.

A. Yamashita, T. Amano, K. Toyokawa and H. Takahashi, "A Model Based Layout Understanding Method for Document Recognition System," Proc. 1ST INT. Conf. on Document Analysis and Recognition, pp. 130–138, 1991.

Then, the commands to be mentioned later are selected and inputted in order to increase the flexibility of the layout model according to necessity (Step 104 in FIG. 10) to modify the layout model (Step 105) and the modified results are recorded in the layout model (Step 106).

When the layout model is modified (Steps 104 and 105 in FIG. 10), it is possible to define repetition of the child node. Thus, the layout model increases its flexibility to cover many document images. Especially when a layout model is generated from a document image as shown in the present invention, a flexible model should be generated by giving redundancy to the model.

To give redundancy to the model, there is a method for setting a default value by a macroparameter. It is also possible to prepare a method in which the area included in an area can be repeatedly defined. The command for modifying a layout model includes "AUTOMATICALLY MODIFY", "SINGULARIZE", and "PLURALIZE".

Figure 14:
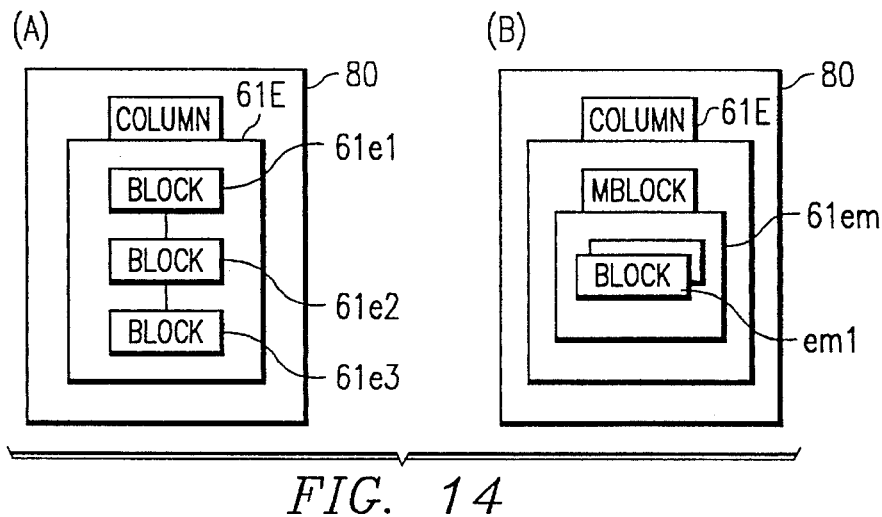
FIG. 14 shows the processing for a layout model by the command "AUTOMATICALLY MODIFY"

The command "AUTOMATICALLY MODIFY" repeatedly executes definition automatically. As shown in FIG. 14, when macroparameters with the same name are set to a plurality of nodes, the display of the node is changed to the display showing repetition of an area by the command "AUTOMATICALLY MODIFY". That is, the second descendant nodes 61*e*1 through 61*e*3 specified with the same parameter are deleted with the original tree structure preserved {(A) in FIG. 14} and, instead, the variable number of third descendant node "em1" and dummy second descendant node 61em are inserted {(B) in FIG. 14}. In view of the definition of the model, when an area is repeated, the dummy node 61*em* is always formed and a parameter including a number of repetitions M is set.

Figure 15:
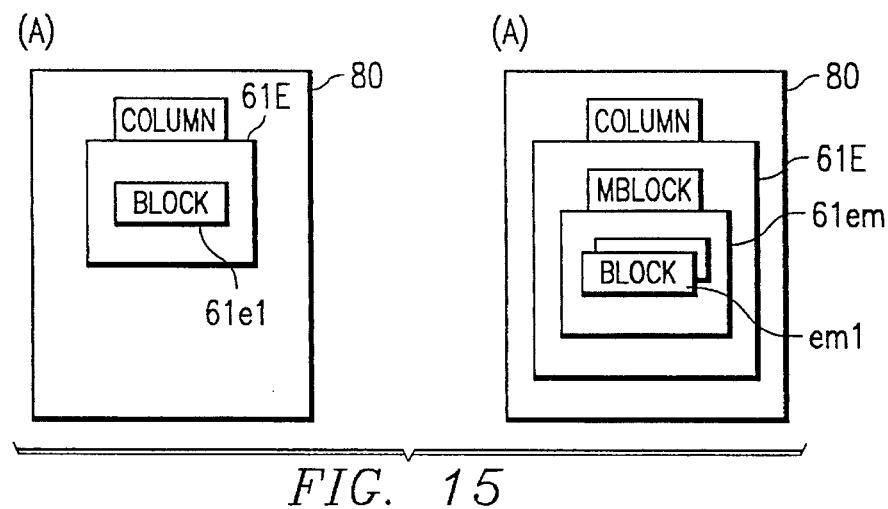
FIG. 15 shows the processing for a layout model by the command "SINGULARIZE"

The command "PLURALIZE" deletes the single second descendant node 61*e*1 with the original tree structure preserved under the state of (A) in FIG. 15 and, instead, inserts a variable number of the third descendant node "em1" and the dummy second descendant node 61*em* {(B) in FIG. 15}. When only one area is produced as the result of image analysis, it is possible to select the repetition display by using the command "PLURALIZE" by considering flexibility.

Figure 16:
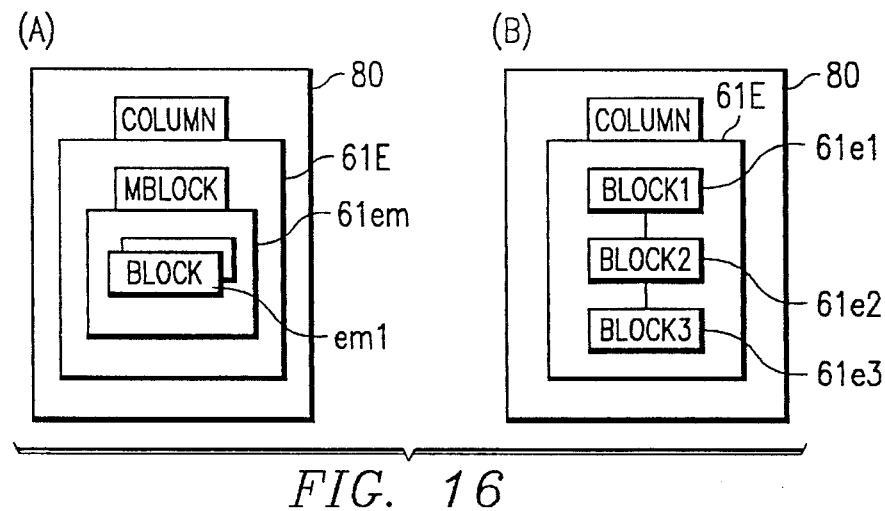
FIG. 16 shows the processing for a layout model by the command "PLURALIZE"

As shown in FIG. 16, the command "SINGULARIZE" deletes the variable number of the third descendant node "em1" and the dummy second descendant node 61em under the state of (A) and, instead, inserts the second descendant nodes 61*e*1 through 61*e*3 of the original tree structure.

Because the information for the number of child nodes and that of second descendant nodes of these tree structures 61 are recorded in the space for the parent node of the macroparameter table, the parameter of the parent node is internally determined when setting of the parameters of the second-descendant and child nodes is completed. Parameters with a fine number of repetitions can be reset any time by the command "SET".

Figure 17:
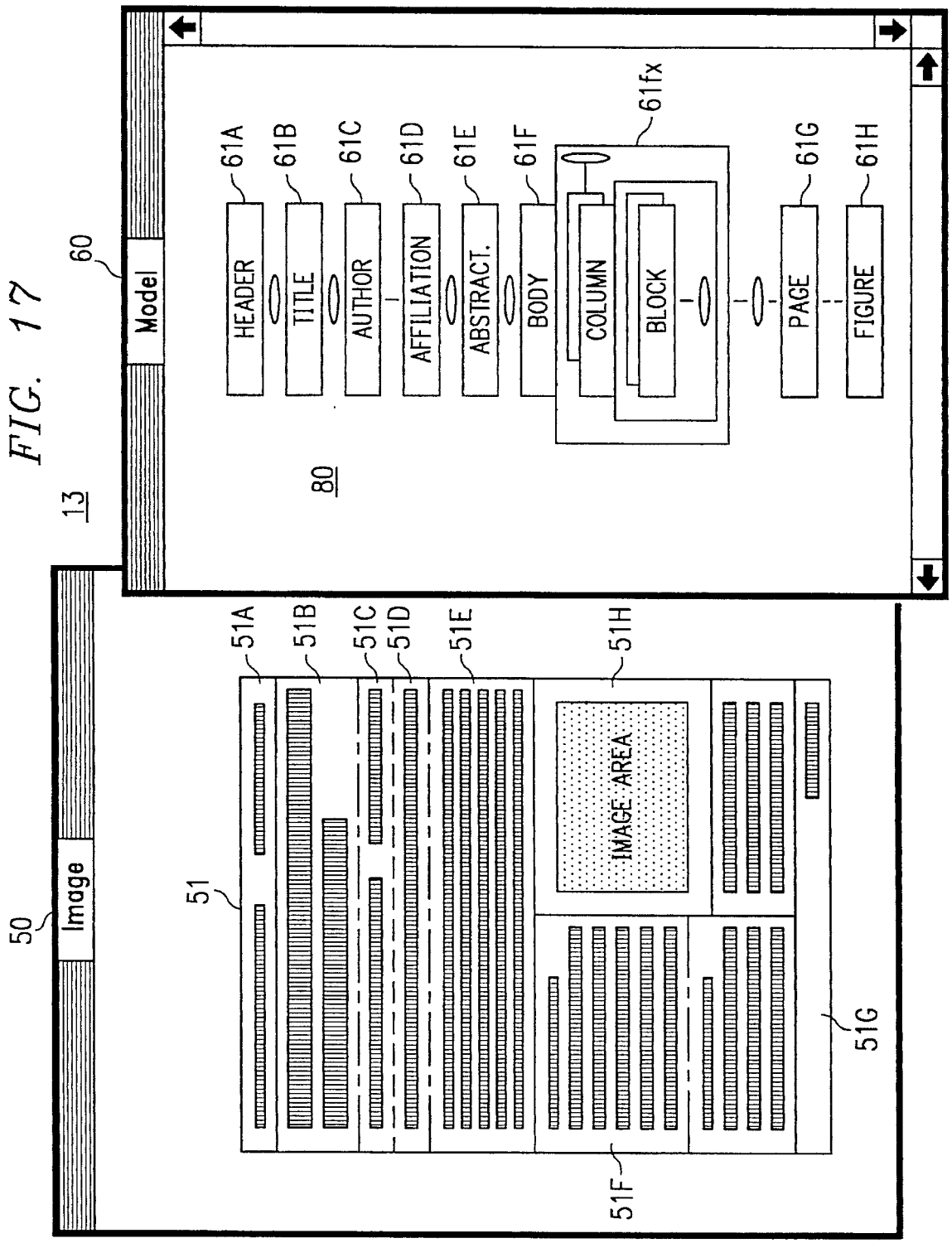
FIG. 17 shows the layout model generated by correcting the area segmentation displayed on the screen display unit in FIG. 6.

As described above, an example of the layout model 80 finally generated by generating a tree structure from the image 51 in FIG. 6 and correcting it is shown in the model window 60 of FIG. 17. Thus, a flexible layout model capable of covering the same type of document images can be graphically generated from the results of analyzing one image.

The following is the description of an embodiment made by applying the present invention to generation of a layout model for an address book in accordance with FIG. 18. The area segmenting direction always appears vertically and horizontally by turns as the depth of the tree structure hierarchy increases. For the embodiment previously described, however, the first segmenting direction is assumed as the vertical direction. This is because the segmentation frequency in this direction is high in general. As a result, when address book 90 in FIG. 18 is automatically area-segmented by this method, the physical boundary becomes different from the logical boundary. That is, the address book 90 is segmented into areas (51A through 51D) by the vertical separator 33 serving as the physical boundary. If the areas are directly used for a layout model, definition results in a document consisting of four columns vertically arranged in parallel {(B) in FIG. 18}. However, because a name, zip code, and address are generally put in the address book in the horizontal direction, horizontal area segmentation is logically significant.

To avoid the above trouble, it is necessary to prepare a macroparameter suitable for processing the type of document having the above special segmenting direction. For example, it is previously defined that the macroparameter "address book" is followed by a child node "person" in parameter specification and set to a parent node. When the macroparameter is used, nodes under the "address book" are examined on a model. If a corresponding node is present, insertion occurs to the node. If not, insertion occurs to a child node. Then, modification occurs as shown in (C) of FIG. 18. That is, because the child node "person" is not present under parent node 61P in (B), a variable number of child nodes 61N is inserted between the parent node 61P and child nodes 61A through 61D and the tree structure is changed so that the original child nodes 61A through 61D serve as second descendant nodes 61a1 through 61a4 {(C) in FIG. 18}. In this case, though the parameter Dir. showing the direction in which the child nodes 61A through 61D are arranged is Ver. (vertical) in the original analysis results, the direction in which the second descendant nodes are arranged under child node 61N (person) newly inserted by the parameter specification "address book" becomes Hor. (horizontal).

Therefore, it is preferable to prepare not only the Collection of parameters but a macroparameter in which up to a hierarchical structure is set in model definition for a document in which the physical analysis result is different from the logical structure (e.g. table format document such as a telephone directory or schedule table). The macroparameter has the function to insert an imaginary node which does not appear in the analysis result and to automatically change the arrangement of child nodes in a direction different from the analysis result (vertical to horizontal and vice versa). It is possible to generate a correct model by using the macroparameter and forcibly modifying the actually obtained physical structure. Approximately the same result can be obtained on a model by re-enclosing individual data for one person on the image analysis result.

The present invention can also be used to retrieve and decode a document in the same way as an electronic filing system. In this case, a usage is also considered to specify only the text area of the image of a specific document and directly read the area without generating a flexible layout model.

Figure 20:
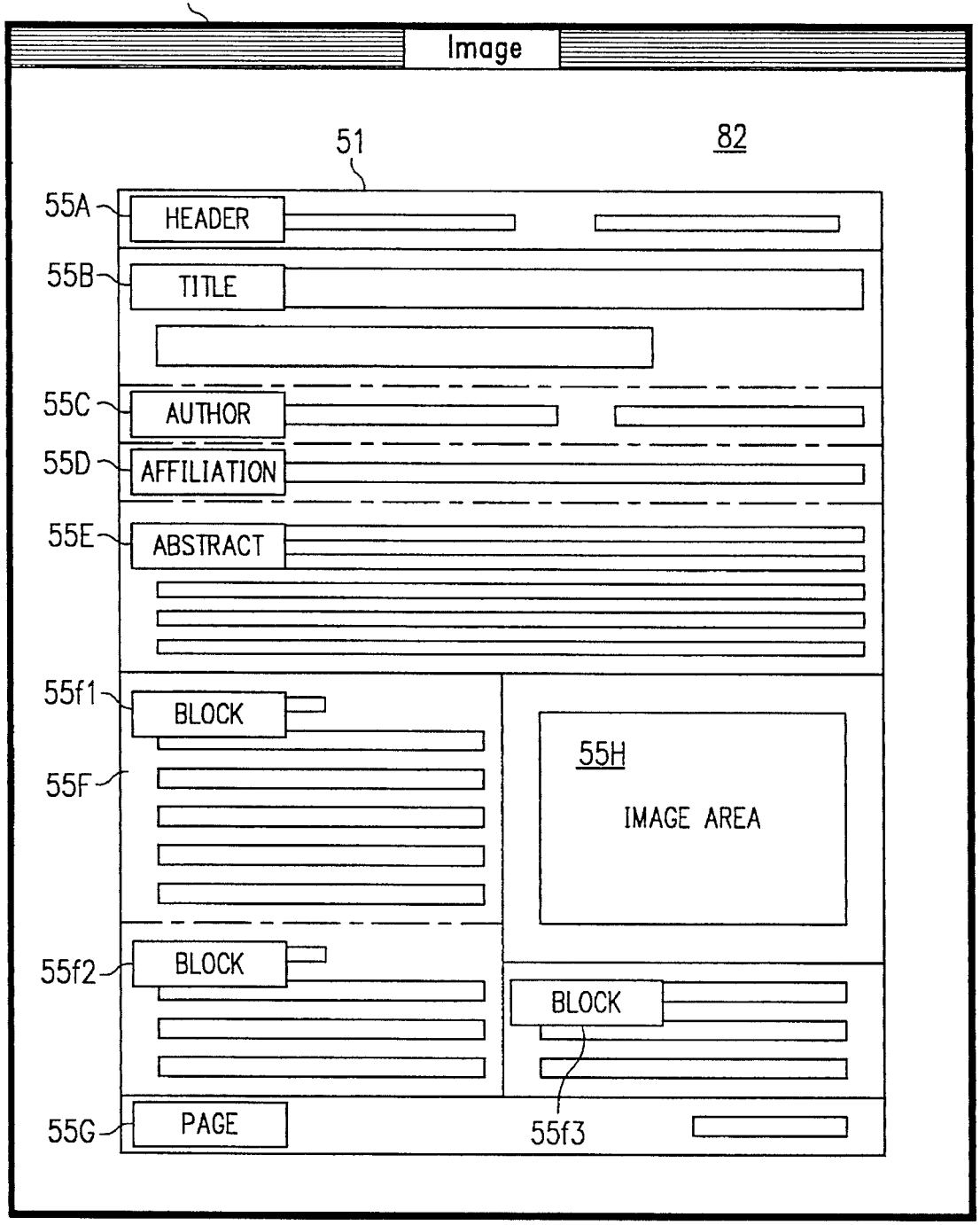
FIG. 20 shows the image window of the screen display unit showing the results obtained by the method in FIG. 19.

FIGS. 19 and 20 show embodiments suitable for the above purpose. In this case, parameters can be set to not only the model window 60 but the image window 50. First, data for the tree structure is read (Step 191) and displayed on the image window 50 together with a document image (Step 192). Then, a macroparameter is directly set to the text area (Step 193). Subsequently, a layout model is generated by the same method as that shown in the model window 60 and the results are recorded in the layout model storage unit 10. The model in this case is not always flexible, but it is peculiar to the page of an analyzed document.

Thus, a layout model 82 having a set of parameters (55A through 55H) is generated in the image window 50 and stored together with the page (Step 195). Characters of a document image are recognized and read by the character recognition unit 16 in FIG. 1 and stored in the storage unit by relating the document image with the above layout model. Then, when setting a parameter to be retrieved by using the layout model 82, it is retrieved by the retrieval unit 17 and the character recognition results at the portion concerned of the document image are read and outputted (Step 196). According to this method, a retrieval range can easily be set.

It is also possible to execute the area segmentation of a document image and the layout model generating function by a processor instead of the layout model generation apparatus in FIG. 1 by storing a program including the processing procedure described in FIG. 2 forward in the memory of a general-purpose computer.

As described above, the present invention makes it possible to graphically generate a flexible layout model through modification of hierarchical structure and repetitive specification of area in accordance with actual image analysis results. The user can therefore easily understand the operation. For example, to read a document without a layout model and without the necessity to set the layout model, the present invention can also be used to segment an area, specify the area (node) to be read, and convert it into a character code.

It is possible to easily generate the tree structure of a document by using the image analysis results of the document. It is also possible to generate a flexible layout model by processing only one tree structure extracted by analyzing the image of an actual document.

Moreover, because the user can interactively generate or modify a tree structure or layout model, he easily understand the operation.

Although the present invention has been particularly shown and described with reference to the preferred embodiment, it will be understood by those skilled in the art that various changes in form and detail may be made without departing from the spirit and the scope of the invention.

What we claim is:

1. A method for generating a layout model to define objects of a document image by an apparatus having an input unit, an area generation unit, a layout model generation unit, a storage unit and a display unit, comprising the steps of:

analyzing an inputted document image with said area generation unit to extract separators to separate the objects of the document in order to segment said document image into a plurality of areas and create a tree structure in accordance with said areas and said separators;

displaying said document image on said display unit together with a schematic representation of said tree structure;

correcting said tree structure, if required, with said area generation unit by manipulation of said areas;

generating a layout model, having nodes assigned, wherein the nodes have no attribute data associated therewith, wherein each node corresponds to each of respective said areas displayed in said schematic representation, by said layout model generation unit in order to display said layout model on said display unit; and assigning a previously inputted macroparameter to each of said nodes with no attribute data associated therewith, wherein said macroparameter rearranges said nodes when said layout model does not correspond to the document image.

2. A document image layout model generation apparatus for generating a layout model to define objects of a document image, comprising:

an automatic area segmentation unit for analyzing an inputted document image to extract separators to separate the objects of the document image and to segment said document image into a tree structure in accordance with said separators;

means for displaying said tree structure on a display unit together with said document image;

an area structure modification unit for modifying said tree structure by manipulation of elements of said tree structure; and a layout model generation unit for completing a layout model having nodes assigned, wherein the nodes have no attribute data associated therewith, wherein each node corresponds to each of a respective area of said tree structure for display on said display unit, and for setting a previously inputted macroparameter which rearranges said nodes when said layout model does not correspond to the document image.

* * * * *